(12) United States Patent
Chiba et al.

(10) Patent No.: US 10,383,009 B2
(45) Date of Patent: Aug. 13, 2019

(54) HANDOVER OF A TERMINAL IN DUAL CONNECTIVITY MODE

(71) Applicant: Nokia Solutions and Networks Oy, Espoo (FI)

(72) Inventors: Tsunehiko Chiba, Saitama (JP); Srinivasan Selvaganapathy, Bangalore (IN)

(73) Assignee: Nokia Solutions and Networks Oy, Espoo (FI)

(*) Notice: Subject to any disclaimer, the term of this patent is extended or adjusted under 35 U.S.C. 154(b) by 99 days.

(21) Appl. No.: 15/522,716

(22) PCT Filed: Nov. 6, 2014

(86) PCT No.: PCT/EP2014/073883
§ 371 (c)(1),
(2) Date: Apr. 27, 2017

(87) PCT Pub. No.: WO2016/070920
PCT Pub. Date: May 12, 2016

(65) Prior Publication Data
US 2017/0318503 A1    Nov. 2, 2017

(51) Int. Cl.
| | | |
|---|---|---|
| *H04W 36/00* | (2009.01) | |
| *H04W 24/02* | (2009.01) | |
| *H04W 36/32* | (2009.01) | |
| *H04W 84/18* | (2009.01) | |

(52) U.S. Cl.
CPC ....... *H04W 36/0027* (2013.01); *H04W 24/02* (2013.01); *H04W 36/32* (2013.01); *H04W 36/00* (2013.01); *H04W 36/0069* (2018.08); *H04W 84/18* (2013.01)

(58) Field of Classification Search
None
See application file for complete search history.

(56) References Cited

U.S. PATENT DOCUMENTS

| | | | | |
|---|---|---|---|---|
| 9,504,052 B2* | 11/2016 | Wu | ...................... | H04W 72/085 |
| 9,838,945 B2* | 12/2017 | Wu | ...................... | H04W 40/14 |
| 2015/0133122 A1* | 5/2015 | Chen | ...................... | H04W 36/04 |
| | | | | 455/436 |

OTHER PUBLICATIONS

"3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12)", 3GPP TR 36.842, V1.0.0, Nov. 2013, pp. 1-68.

"Revised Work Item Description: Dual Connectivity for LTE", 3GPP TSG-RAN meeting #65, RP-141266, Agenda: 11.7.9, NTT Docomo Inc, Sep. 9-12, 2014, 8 Pages.

"Introduction of Dual Connectivity", 3GPP TSG-RAN Working Group 3 meeting #85, R3-141972, Ericsson, Aug. 18-22, 2014, 18 Pages.

(Continued)

*Primary Examiner* — Phuongchau Ba Nguyen
(74) *Attorney, Agent, or Firm* — Harrington & Smith

(57) ABSTRACT

Methods and apparatuses for controlling dual connectivity in a communication system are disclosed. Information on at least one failure in relation to a cell change of a communication device connected to a master access point and a secondary access point is determined. The determined information is communicated to the secondary access point. The secondary access point uses the information in mobility control.

14 Claims, 4 Drawing Sheets

(56) References Cited

OTHER PUBLICATIONS

"Introduction of Dual Connectivity", 3GPP TSG-RAN Working Group 3 meeting #85, R3-142044, Ericsson, Aug. 18-22, 2014, 106 Pages.
"Introduction of Dual Connectivity (RAN3 topics)", 3GPP TSG-RAN Working Group 3 meeting #85, R3-141966, Rapporteur (NEC), Aug. 18-22, 2014, 64 Pages.
Office action received for corresponding European Patent Application No. 14796473.8, dated Mar. 23, 2018, 7 pages.
International Search Report and Written Opinion received for corresponding Patent Cooperation Treaty Application No. PCT/EP2014/073883 dated Jul. 17, 2015, 15 pages.
Huawei: "X2 Signalling to Support Dual Connectivity", 3GPP Draft; R3-140118 X2 Signalling to Support Dual Connectivity, 3rd Generation Partnership Project (3GPP), Mobile Competence Centre ; 650, Route Des Lucioles ; F-06921 Sophia-Antipolis Cedex ; Franc vol. RAN WG3, No. Prague, Czech Republic; Feb. 10, 2014-Feb. 14, 2014 Feb. 9, 2014 (Feb. 9, 2014), XP050738559.
CMCC: "Informing SeNB to stop transmission towards UE", 3GPP Draft; R3-140659JNF0RMING SENB to Stop Transmission Towards UE, 3rd Generation Partnership Project (3GPP), Mobile Competence Centre ; 650, Route Des Lucioles ; F-06921 Sophia-Antipolis Cedex; F vol. RAN WG3, No. San Jose del Cabo, Mexico; Mar. 31, 2014-Apr. 4, 2014 Mar. 30, 2014 (Mar. 30, 2014), XP050795351.
Ericsson: "Secondary Radio Link Failure (S-RLF)", 3GPP Draft; R2-141542—Secondary Radio Link Failure (S-RLF), 3rd Generation Partnership Project (3GPP), Mobile Competence Centre ; 650, Route Des Lucioles ; F-06921 Sophia-Antipolis Cedex; France vol. RAN WG2, No. Valencia, Spain; Mar. 31, 2014-Apr. 4, 2014 Mar. 22, 2014 (Mar. 22, 2014), XP050792702.
Huawei (Rapporteur): "Report and summary of email discussion [87#22] [LTE/DC] S-RLF and Reestablishment", 3GPP Draft; R2-144540, 3rd Generation Partnership Project (3GPP), Mobile Competence Centre ; 650, Route Des Lucioles ; F-06921 Sophia-Antipolis Cedex ; France vol. RAN WG2, No. Shanghai, China;Oct. 6, 2014-Oct. 10, 2014 Sep. 27, 2014 (Sep. 27, 2014), XP050870557.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP Standard; 3GPP TS 36.300, 3rd Generation Partnership Project (3GPP), Mobile Competence Centre ; 650, Route Des Lucioles ; F-06921 Sophia-Antipolis Cedex ; France, vol. RAN WG2, No. V12.3.0, Sep. 18, 2014 (Sep. 18, 2014), pp. 1-215.

* cited by examiner

HANDOVER OF A TERMINAL IN DUAL CONNECTIVITY MODE

RELATED APPLICATION

This application was originally filed as Patent Cooperation Treaty Application No. PCT/EP2014/073883 filed Nov. 6, 2014.

This disclosure relates to communications in wireless systems and more particularly communications by a wireless communication device in dual connectivity mode.

A communication system can be seen as a facility that enables communications between two or more nodes such as fixed or mobile communication devices, access points such as base stations, servers, machine type devices, and so on. A communication system and compatible communicating entities typically operate in accordance with a given standard or specification which sets out what the various entities associated with the system are permitted to do and how that should be achieved. For example, the standards, specifications and related protocols can define the manner how communications between communication devices and the access points shall be arranged, how various aspects of the communications shall be provided and how the equipment shall be configured.

Signals can be carried on wired or wireless carriers. Examples of wireless systems include public land mobile networks (PLMN), satellite based communication systems and different wireless local networks, for example wireless local area networks (WLAN). Wireless systems can be divided into coverage areas referred to as cells, and hence the wireless systems are often referred to as cellular systems. An access point or node, for example a base station can provide one or more cells, there being various different types of base stations and cells. Third Generation Partnership Project (3GPP) Long Term Evolution (LTE) standard refers to base stations by the terms NodeB (NB) and enhanced NodeB (eNodeB: eNB).

A user can access a communication system via one or more access nodes by means of an appropriate communication device or terminal. Typically a communication device is used for receiving and transmission of communications such as speech and data. A communication device is provided with an appropriate signal receiving and transmitting arrangement for enabling communication with other parties. The communication device may access a carrier provided by an access point such as a base station, and transmit and/or receive communications on the carrier. Communication devices of users are often referred to as user equipment (UE).

Dual connectivity (DC) has been proposed as a possible higher layer enhancement. In dual connectivity a device can be simultaneously connected with a master access node (e.g. master eNB; MeNB) and a secondary access node (e.g. a secondary eNB; SeNB). Advantages of dual connectivity include gains in throughput and mobility robustness. Currently dual connectivity is considered to be particularly advantageous for small cells.

FIG. 1 and FIG. 2 show examples of control plane and user plane architectures of eNBs and network entities involved for dual connectivity, respectively, in accordance with 3GPP specifications. The RRC connected mode can be configured with a Master Cell Group (MCG) and a Secondary Cell Group (SCG). A master eNB (MeNB) node provides a radio resource control (RRC) anchor for the dual connectivity. Thus a single radio resource control (RRC) between a MeNB and a UE is provided for control plane architecture for dual connectivity. In LTE S1 interface provides a standardized interface between the eNBs and an Evolved Packet Core (EPC) where user plane interface S1-U is for transport of user datagrams between an eNB and a serving gateway (S-GW). A secondary cell group (SCG) bearer can be served by a secondary eNB (SeNB) alone. Dual connectivity (DC) is thus a possible state for a UE in radio resource control connected (RRC_CONNECTED) mode.

Currently three types of bearers may be provided in dual connectivity, namely MCG bearers, split bearers and SCG bearers. For MCG bearers, the master eNB (MeNB) is user-plane connected to the S-GW via S1-U interface. The secondary eNB (SeNB) is not involved in the transport of user plane data. For split bearers, the MeNB is user-plane connected to the S-GW via S1-U interface and the MeNB and the SeNB are interconnected via X2-U interface. For SCG bearers, the SeNB is directly connected with the S-GW via S1-U.

Error situations are possible, especially because of the user mobility from an eNB to another. The mobile device can move between the secondary eNBs or between a SeNB and MeNB. Mobility robustness optimization (MRO) is a mechanism for automatic detection and correction of errors in mobility configuration. In certain applications the focus of MRO is on errors that may cause radio link failure (RLF) due to too late or early handover, or handover to an incorrect cell.

Support for Self Organized Network (SON) functionality in dual connectivity has been proposed. It is contemplated that mobility robustness optimization (MRO) can also be provided in SeNB in dual connectivity (DC) mode where the MRO addresses too-late or too-early handover etc. However, there are no concrete proposals how to handle e.g. too-early handovers and how to provide mobility robustness optimization.

MRO can involve updating mobility control parameters based on cell change failure reports received from UEs. A particular problematic issue is caused by the master eNB (MeNB) node providing the radio resource control (RRC) anchor for the dual connectivity as the MeNB uses its own mobility control parameters for controlling mobility within a cluster of small cells. This, however, can be inconsistent with the single connectivity mode where mobility and MRO are controlled by the small cells themselves. Also, the MRO adjustments at SeNB can be slow and cannot use Secondary ell Group (SCG) mobility failure information available at the MeNB.

It is noted that the above discussed issues are not limited to any particular communication environment and station apparatus but may occur in any appropriate system.

Embodiments of the invention aim to address one or several of the above issues.

In accordance with an embodiment there is provided a method for controlling dual connectivity in a communication system, comprising determining information on at least one failure in relation to a cell change of a communication device connected to a master access point and a secondary access point, and causing communication of the determined information to the secondary access point for use in mobility control by the secondary access point.

In accordance with an embodiment there is provided a method for controlling dual connectivity in a communication system, comprising receiving at a secondary access point information on at least one failure in relation to a cell change of a communication device connected to a master access point and the secondary access point, and using the information in mobility control by the secondary access point.

In accordance with an embodiment there is provided an apparatus for controlling dual connectivity in a communication system, the apparatus comprising at least one processor, and at least one memory including computer program code, wherein the at least one memory and the computer program code are configured, with the at least one processor, to determine information on at least one failure in relation to a cell change of a communication device connected to a master access point and a secondary access point, and cause communication of the determined information to the secondary access point for use in mobility control by the secondary access point.

In accordance with an embodiment there is provided an apparatus for controlling dual connectivity in a communication system, the apparatus comprising at least one processor, and at least one memory including computer program code, wherein the at least one memory and the computer program code are configured, with the at least one processor, to receive at a secondary access point information on at least one failure in relation to a cell change of a communication device connected to a master access point and the secondary access point, and use the information in mobility control by the secondary access point.

In accordance with a more specific embodiment the dual connectivity control comprises mobility robustness optimisation. Said information on at least one failure may be determined based on information provided by at least one communication device regarding at least one secondary radio link failure. Wherein the at least one failure comprises one of too early handover and handover to a wrong cell.

The secondary access point can adjust its mobility configuration based on single connectivity mobility failure information and dual connectivity mobility failure information.

Information on mobility control parameters of a secondary access point may be communicated to a master access point. Information on the mobility control parameters may be communicated as an offset to a predetermined value or values.

Various information may be exchanged between a master access point and a secondary access point. The information may be related to at least one of hysteresis, time-to-trigger, mobility events threshold, a cell individual offset to neighbour cells, updated measurement parameters, differentiating between mobility configurations, determined failure type, failed cells, source cells, and type of the cell change.

A record of at least one previously connected secondary access point may be maintained after successful change of the communication device to a new secondary access point. Information of a secondary radio link failure may be received within a predefined period and the type of the failure at least in part based on information of a best reported cell.

Different mobility configurations of the secondary access point may be provided. The different profiles may be based on at least one of quality of service profile of the communication device, interference profile of the communication device, and information whether the mobility control is provided between secondary access points or between a secondary access point and a master access point.

A secondary access point may also inform mobility profile identify along with other information related to mobility control to a master access point. A master access point may communicate mobility profile identity along with other information on the at least one failure to at least one secondary access point.

In specific embodiments the communications device is connected to a master eNodeB and a secondary eNodeB.

A computer program comprising program code means adapted to perform the herein described methods may also be provided. In accordance with further embodiments apparatus and/or computer program product that can be embodied on a computer readable medium for implementing at least one of the above methods is provided.

A network node such as a base station or a controller entity for controlling communications can be configured to operate in accordance with at least some of the embodiments. A communication system embodying the apparatus and principles of the invention may also be provided.

It should be appreciated that any feature of any aspect may be combined with any other feature of any other aspect.

Embodiments will now be described in further detail, by way of example only, with reference to the following examples and accompanying drawings, in which.

In the following certain exemplifying embodiments are explained with reference to a wireless or mobile communication system serving mobile communication devices that can connect via a multiple of access points. Before explaining in detail the exemplifying embodiments, certain general principles of a wireless communication system, access systems thereof, and mobile communication devices are briefly explained with reference to FIGS. 3 and 4 to assist in understanding the technology underlying the described examples.

A non-limiting example of the recent developments in communication system architectures is the long-term evolution (LTE) of the Universal Mobile Telecommunications System (UMTS) that is being standardized by the 3rd Generation Partnership Project (3GPP). The LTE employs a mobile architecture known as the Evolved Universal Terrestrial Radio Access Network (E-UTRAN). Base stations of such systems are known as evolved or enhanced Node Bs (eNodeBs; eNBs) and may provide E-UTRAN features such as user plane Radio Link Control/Medium Access Control/Physical layer protocol (RLC/MAC/PHY) and control plane Radio Resource Control (RRC) protocol terminations towards communication devices. Other examples of radio access nodes include those provided based on technologies such as wireless local area network (WLAN) and/or WiMax (Worldwide Interoperability for Microwave Access).

Figure 3:
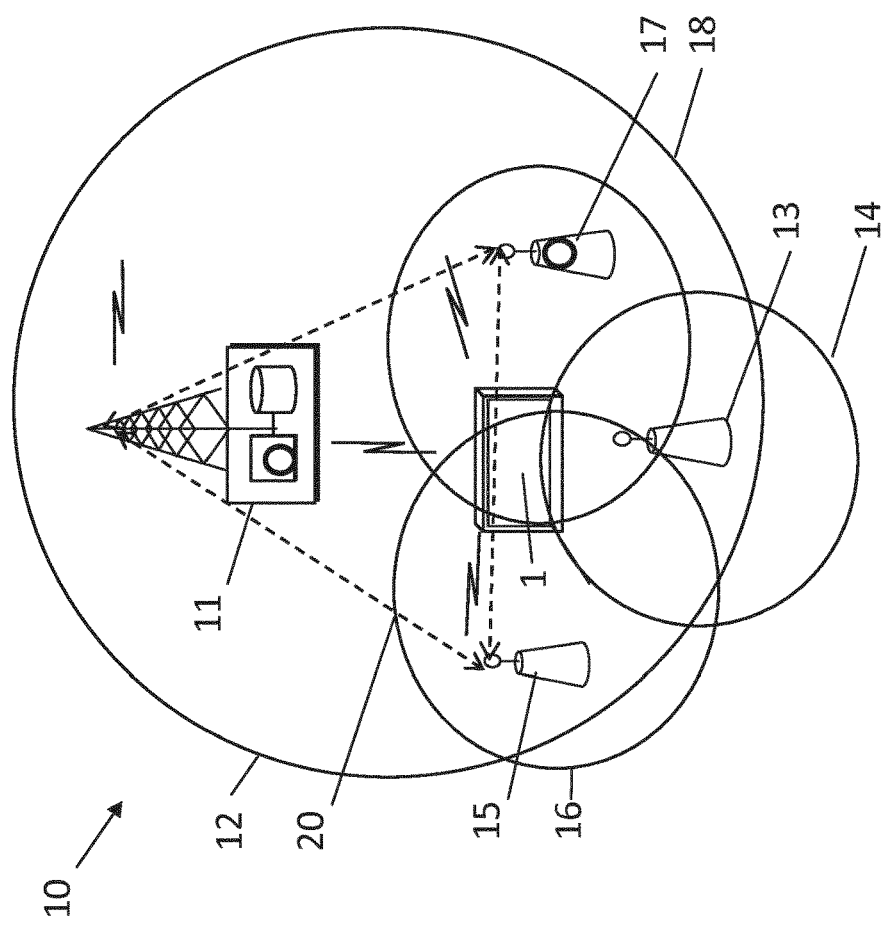
FIG. 3 shows a schematic diagram of a cellular system where certain embodiments can be implemented.

Communication devices or terminals 1 can be provided wireless access via base stations or similar wireless transmitter and/or receiver nodes providing radio service areas or cells. FIG. 3 shows a system 10 comprising four access points provided by base station nodes 11, 13, 15 and 17. Each base station node is shown to provide a radio service area or cell 12, 14, 16 and 18. It is noted that the nodes are shown only for illustration purposes and that a larger or smaller number of communication devices and base stations sites may be provided. A base station site can provide more than one cell or sector. A sector may provide a cell or a subarea of a cell. Thus it shall be appreciated that the number, size and shape of cells may vary considerably.

Base stations and hence communications in cells are typically controlled by at least one appropriate controller apparatus so as to enable operation thereof and management of mobile communication devices in communication with the base stations. The control apparatus can be interconnected with other control entities. The control apparatus can typically be provided with memory capacity and at least one data processor. The control apparatus and functions may be distributed between several control units. In some embodiments, each base station can comprise a control apparatus. In alternative embodiments, two or more base stations may share a control apparatus. For example, in LTE control apparatus of a given eNB can control several cells.

Figure 5:
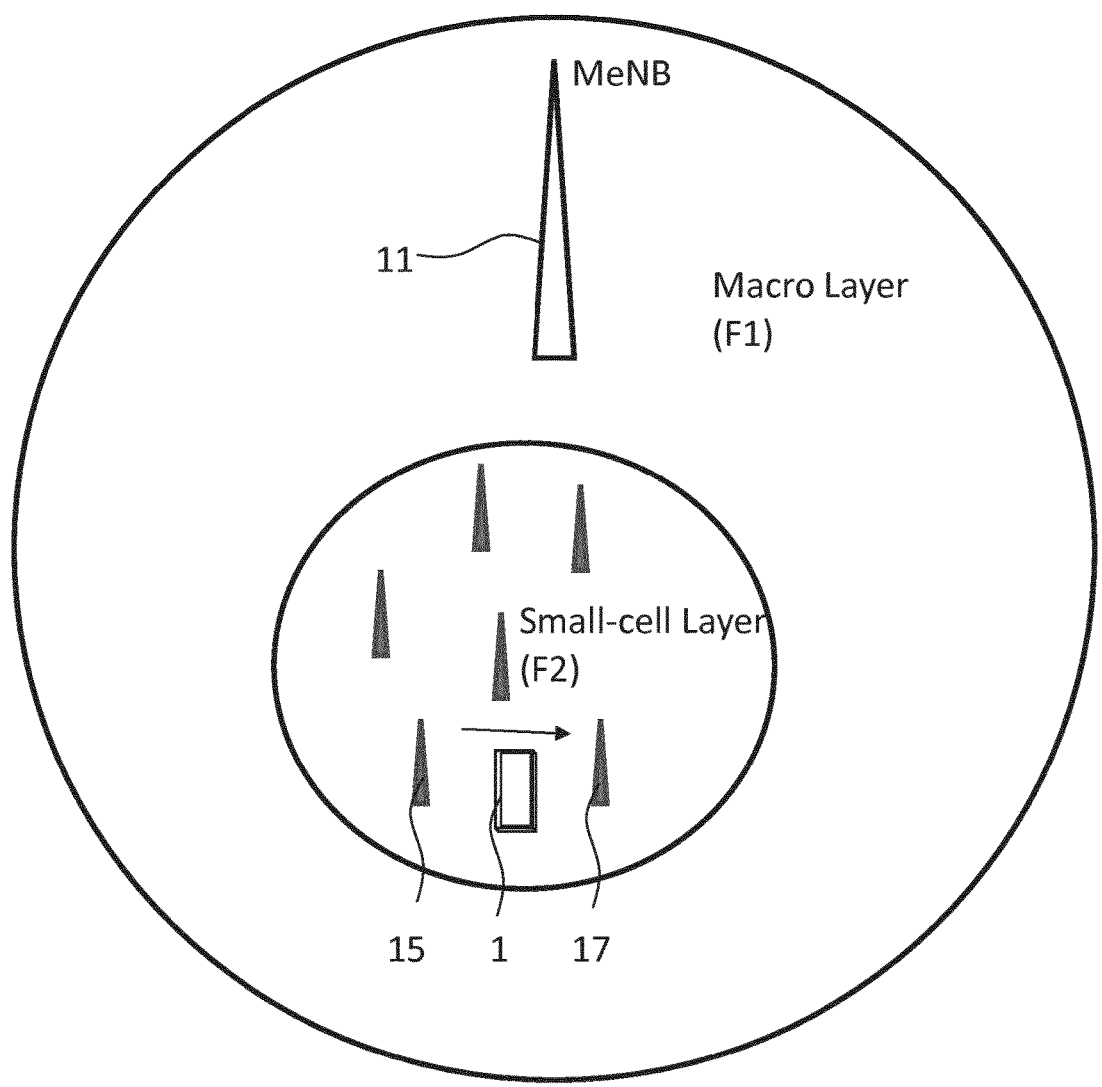
FIG. 5 shows an example of an arrangement comprising small and macro layer cells.

Different types of possible cells include those known as macro cells, pico cells and femto cells. For example, transmission/reception points or base stations can comprise wide area network nodes such as a macro eNode B (eNB) which may, for example, provide coverage for an entire cell or similar radio service area. Base station can also be provided by small or local radio service area network nodes, for example Home eNBs (HeNB), pico eNodeBs (pico-eNB), or femto nodes. Some applications utilise radio remote heads (RRH) that are connected for example to an eNB. Different cell can be seen as being arranged on different cell layers. An example of this is illustrated in FIG. 5.

Base stations and associated controllers may communicate via each other via fixed line connection and/or air interface. The logical connection between the base station nodes can be provided for example by an X2 interface. In FIG. 3 this interface is shown by the dashed line denoted by 20.

The communication devices 1 may comprise any suitable device capable of at least receiving wireless communication of data. For example, the terminals can be handheld data processing devices equipped with radio receiver, data processing and user interface apparatus. Non-limiting examples include a mobile station (MS) such as a mobile phone or what is known as a 'smart phone', a portable computer such as a laptop or a tablet computer provided with a wireless interface card or other wireless interface facility, personal data assistant (PDA) provided with wireless communication capabilities, or any combinations of these or the like. Further examples include wearable wireless devices such as those integrated with watches or smart watches, eyewear, helmets, hats, clothing, ear pieces with wireless connectivity, jewellery and so on, universal serial bus (USB) sticks with wireless capabilities, modem data cards or any combinations of these or the like. Communication devices of users are often referred to as user equipment (UE).

Figures 1, 2:
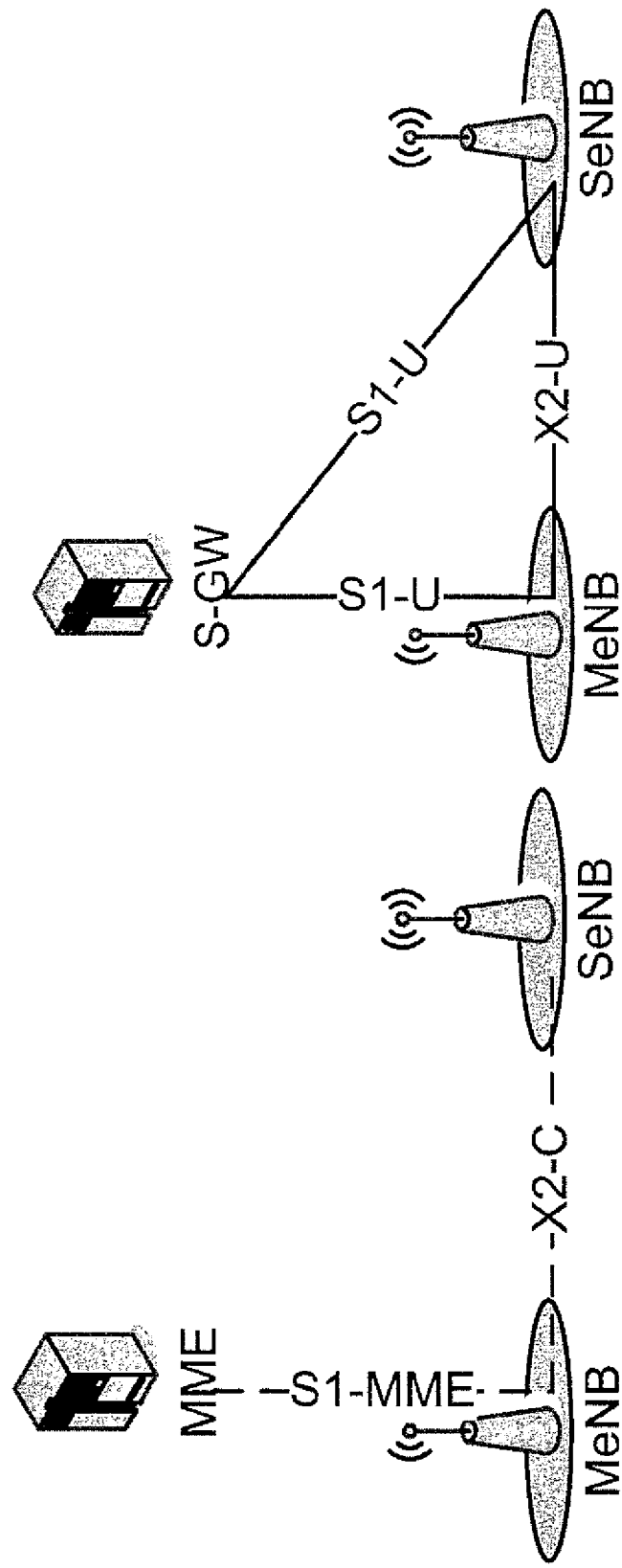
FIG. 1 shows a schematic diagram of control plane interfaces of an access point provided by an eNB in dual connectivity scenario.
FIG. 2 shows a schematic diagram of user plane interfaces of an access point provided by an eNB in dual connectivity scenario.
Figure 4:
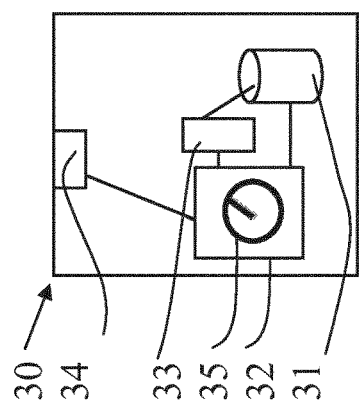
FIG. 4 shows a schematic diagram of a control apparatus according to some embodiments.

FIG. 4 shows an example of a control apparatus for a node, for example to be integrated with, coupled to and/or otherwise for controlling any of the base stations. The control apparatus 30 can be arranged to provide control on communications in the service area of a base station site. The control apparatus 30 can be configured to provide control functions in association with single and dual connectivity communications in accordance with certain embodiments described below. For this purpose the control apparatus comprises at least one memory 31, at least one data processing unit 32, 33 and an input/output interface 34. Via the interface the control apparatus can be coupled to at least one receiver and at least one transmitter of the base station. The control apparatus can be configured to execute an appropriate software code to provide the control functions. It shall be appreciated that similar components can be provided in a control apparatus provided elsewhere in the system.

The control apparatus can further comprise at least one timer function 35. The timer function is configured for use in determining one or more periods in accordance with certain embodiments. Thus a node providing an access point can be provided with a timer.

FIG. 5 shows a possible arrangement of access nodes providing hierarchically different cells where the herein proposed principles are applicable. In the shown example macro cells are deployed in carrier F1 and small cells for offloading/hotspots are deployed in another carrier F2. When Mobility Robustness Optimisation (MRO) is provided in single connectivity (SC) mode for UE movement within small cell layer carrier F2, the Mobility Robustness Optimisation operates such that a serving-SeNB has its configured mobility control parameters for mobility within carrier F2. Based on a radio link failure (RLF) and Handover-Report from other SeNBs, the serving-SeNB may find that the current parameter is not optimum. On collection of configurable number of events SeNB can analyse the event and change its mobility control parameter(s) to a more suitable value(s). The process continues again based on further RLF and Handover-Report events.

However, a SeNB can change its mobility configuration without coordination even when dual connectivity (DC) is provided. That is, if dual connectivity is provided the UE mobility can have different triggers for SC and DC. For example, when UE 1 in SC mode moves from SeNB 15 to SeNB 17, the handover is triggered at trigger T1 and Radio-condition R1. But if the same UE moves between SeNBs in DC mode the handover trigger would be trigger T2 and Radio-condition would be R2. This is because the MeNB 11 uses its own mobility control parameters that are different from the mobility control parameters of the serving SeNB.

This inconsistent mobility pattern between DC and SC mobility may be undesirable in certain circumstances. Moreover as the SeNB mobility failure events are handled at the MeNB these failures are not taken into account for the purposes of adjustment of the SeNB MRO. Thus the SeNB cannot benefit from event analysis made, even though the analysis concerns the SeNB. To illustrate, there can be one thousand UE mobility events as DC and twenty SLFs detected at a MeNB within a small-cell layer within one hour. This information is not known to the SeNB, and the SeNB would still be waiting for a failure to be reported through SC UE mechanism to adjust its MRO. This can be addressed by coordination of measurement configuration between the MeNB and SeNB(s). Information can be exchanged between the MeNB and SeNBs. For example, X2 messages related to MRO can be exchanged between MeNB and SeNBs.

Figure 6:
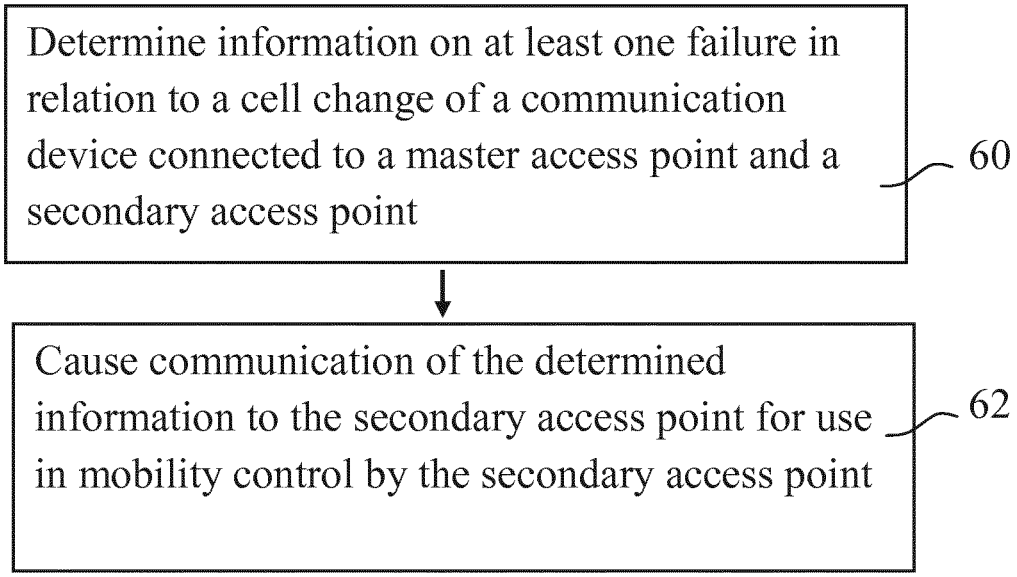
FIGS. 6 and 7 are flowcharts in accordance with certain examples.

FIG. 6 shows a flowchart for operation in a master access point or node in accordance with an example. In the shown method for controlling dual connectivity communications information on at least one failure in relation to a cell change of a communication device connected to a master access point and a secondary access point is determined at 60. The determined information is then communicated at 62 to the secondary access point for use in mobility control by the secondary access point. For example, the information can be used by the secondary access point in mobility robustness optimisation.

Figure 7:
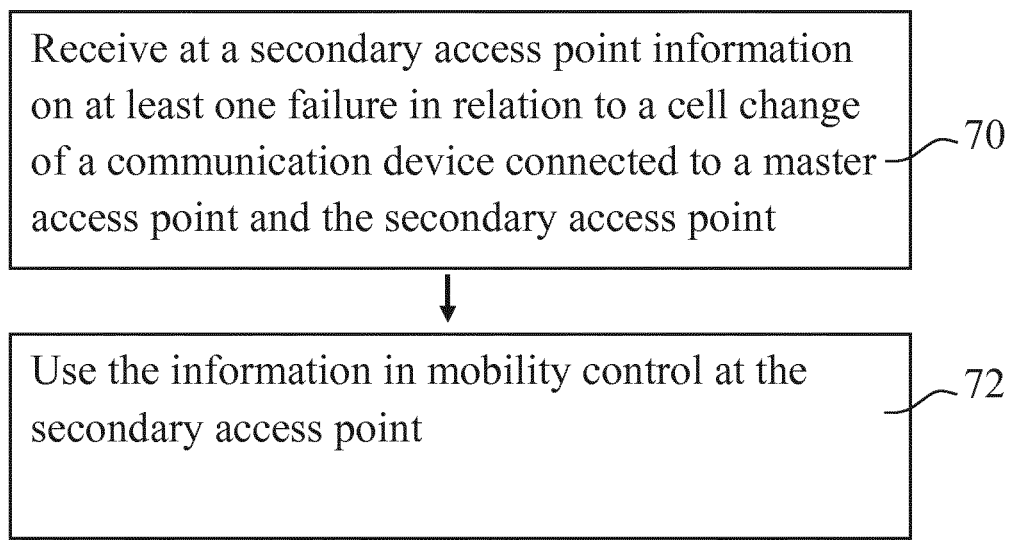

FIG. 7 shows a flowchart for operation at the secondary access point. Information on at least one failure in relation to a cell change of a communication device connected to a master access point and the secondary access point is received at 70. The information is then used at 72 in mobility control by the secondary access point. The information may be received directly or indirectly from the master access point. In the latter case the information may be received from another secondary access point.

Mobility control can be based on appropriate mobility control parameters. Examples of such parameters comprise handover and/or reselection parameters.

Mobility control parameters of the secondary access point that have been modified by taking information from the master access point into account can be communicated to the master access point. The master access point can then communicate control information based on the received mobility control parameters of the secondary access point to relevant at least one communication device. This can be provided to control the mobility settings at the communication device.

In accordance with a more detailed embodiment synchronization of mobility control between the nodes is provided by communication of small cell mobility control parameters of the SeNB to the MeNB. The SeNB can also update or otherwise modify its mobility control parameters for the MRO based on information of cell change failure reports the MeNB has received from UEs and forwarded to the SeNB.

In accordance with a possibility a MeNB uses mobility control parameters that relate to a SeNB for mobility within SCell layer. The MeNB acting as the radio resource control (RRC) anchor for a dual connectivity UE can identify too-early and wrong cell handover events based on secondary radio link failure (SLF) events along with additional information provided based on the SLF reports. The MeNB can also provide information based on the SLF reports to the SeNB. The SeNB can then use both dual connectivity and single connectivity mobility failure information for adjustment of its mobility configurations.

According to a possibility a SeNB may inform mobility control parameter values as offset from the last value instead of providing the actual values to the MeNB to keep the actual mobility control parameter values. By this the SeNB can keep the actual parameters thereof unexposed to the MeNB. This may be desired e.g. in case where the SeNB is provided by a different vendor than the MeNB where vendor of the SeNB may prefer to keep its latest value(s) unexposed to other vendors.

The initial value of these parameters used at the MeNB can be known to the SeNB e.g. via operations and maintenance (OAM) configuration.

Handover parameters of the SeNB may need to be aligned with the parameters of the MeNB. A SeNB modification message can be configured to include a new measurement configuration.

In accordance with a more detailed aspect exchanging handover parameters in dual connectivity can comprise communication of a SeNB-Addition-Response message that has been configured to include information on SeNB-measurement-configuration. This can be provided e.g. by means of a message communicated on the X2 interface. When the mobility parameters of a SeNB are modified by the MRO function thereof the new values are informed to active UE(s). This can be done via a SeNB modification message for each UE which have SCG resource with the SeNB.

According to a possibility an X2-configuration-update message can include configuration information. Thus the X2 configuration update message can be used to provide information on the mobility parameters. If the mobility parameters are informed via the X2 configuration update mechanism it is not necessary to inform these also via the SeNB-Addition-Response messaging or otherwise. Thus, instead of sending a SeNB modification for all UEs a single X2-configuration update can be provided. MeNB can refer to this message and update the measurement configuration for those UE that belong to the SCell mentioned in the message.

Contents of a SeNB-measurement-configuration message or the update message can contain all relevant parameters that relate to SeNB-SeNB mobility. Parameters to be included can comprise values for hysteresis and time-to-trigger. The threshold parameter related to mobility events may also be included. Other possible parameters include the Cell Individual Offset (CIO) value for each neighbour cell.

A possible error case in dual connectivity is too-early handover. In SCG handover where a SeNB change is triggered from SeNB1 to SeNB2 the mobile UE can lose its link with the new SeNB2 even after a per se successful SeNB change within a specific period. The UE then reports the SLF to a relevant MeNB. The SLF report can have information of the measured best cell and an indication that the best-cell is the earlier serving-cell. This can be determined by the MeNB to indicate that there has been too early SeNB change because the UE could not stay in the new cell. This can be so e.g. due to the interference from other cell(s). A SLF can be declared immediately. MeNB can send e.g. a handover report message to the SeNB to indicate a too-early handover so that the SeNB can use this event for its MRO operation.

Another error scenario is wrong-cell handover when the UE is in dual connectivity mode and where a SeNB change is triggered from SeNB1 to SeNB2. After successful SeNB change but within specific duration the UE loses its link with SeNB2. The UE reports the SLF to a relevant MeNB and in here the SLF report indicates the best-cell belonging to SeNB3. In FIG. 3 example the device 1 would have changed from SeNB 15 to SeNB 17 when the measurement would indicate the best cell being provided by SeNB 13.

In these two error scenarios the UE detects the SLF after successful SeNB change (including radio access (RA) success in target-cell). The type of the failure is then determined based on the best cell information. In below certain exemplifying methods to report the above to a secondary eNB are discussed.

MRO events can be informed to a source node in dual connectivity state for example such that a MeNB maintains the last connected SeNB and source-cell information in UE context for specific duration after a successful SeNB change. This information can be maintained e.g. in a UE-context-store of the MeNB. If there is at least one SLF reported within this duration from the current SCG, the MeNB checks the best-cell reported in the SLF report. If the best reported cell points to the latest connected SeNB, the MeNB can determine this event as a too-early handover event based on assumption that the UE could not stay in the new cell. If the MeNB check on the best-cell reported in SLF points to wrong-cell handover (e.g. a further SeNB is indicated as the best cell), MeNB can regard this as a wrong-cell handover event.

The MeNB can send a Handover Report message to the last connected SeNB providing the details of the source-cell for which the handover report is meant for, the failed cells and the determined event-type. For example, the MeNB may send a X2-HANDOVER-REPORT message similar to the last connected SeNB providing the details of source and failed cells and the determined event-type. For example, an indication of a too-early or wrong-cell handover can be provided.

MeNB can include additional parameter indicating that report is related to a SCG change or MeNB-SeNB mobility case. If a SeNB decides to maintain separate set of handover parameters for its handover events and for SeNB change events, the SeNB may provide different handover parameter information to the MeNB during SeNB addition. In this case, in order to allow the SeNB to differentiate whether the report is meant for SeNB-MeNB mobility or for SeNB-SeNB mobility, an additional parameter can be used to indicate this.

Mobility configuration variations can be handled in various manners at a SeNB. It is possible that a SeNB maintains separate measurement configurations (such as Mobility-profile) depending on UE quality of service (QoS) and/or interference profile and so on. Additional mechanisms may be required to map the handover report against the different mobility-configurations. To allow the SeNB to have different mobility control configurations and adjust these based on failure information from the MeNB, additional information on the identity of mobility profile corresponding to a given mobility-configuration may be exchanged between the MeNB and the SeNB. MeNB can store the mobility profile ID against the UE context and use this information while generating handover report based on SLF events. Based on the mobility profile identity information the SeNB can link the mobility failure reports received from the MeNB with the right mobility control configurations.

For example, when a SeNB informs its SeNB-Measurement-Configuration to a MeNB it can also include additional tag "Mobility-profile-Id". The MeNB can store the mobility-profile-Id against the relevant UE context. Whenever the MeNB detects a SeNB mobility failure such as too-late/wrong-cell handover events for this UE, it can include the Mobility-profile-Id in the X2-HANDOVER-REPORT message. The SeNB can then use the profile-Id to detect that the failure corresponds to a specific measurement configuration and apply the optimisation to the specific profile accordingly.

Exchange of handover parameters between a MeNB and a SeNB via a non-UE associated message may also be provided. In this scenario e.g. eNB configuration update mechanism may be used. In case of SeNB MRO algorithm changes the parameters in run-time, the SeNB can indicate these parameters to the MeNB so that the MeNB can modify the measurement parameters to active UEs based on the provided parameters. The SeNB can trigger a SeNB-modification for all connected UEs or configuration-transfer with updated value being sent to the MeNB.

According to an approach a target SeNB generates a handover report to the source SeNB. Instead of, or in addition to, a MeNB maintaining the last connected SCell and SeNB information and deciding on the failure condition, the MeNB can send the SLF Indication to the current SeNB. However, the current SeNB does not necessarily know the actual source SeNB because the SeNB change is controlled by the MeNB and the target-SeNB does not know whether the addition is triggered due to SCG change or not. A SeNB-Addition message triggered due to SCG change event can also include the source-SeNB information, and the target-SeNB can preserve the source-SeNB information after successful SeNB-Addition for a specific duration. On reception of SLF indication from the MeNB, the target SeNB can identify the source-SeNB. If the timer is still running the target SeNB can form the handover report based on SLF report contents and send it to source-SeNB.

This approach can involve two messages for reporting the MRO events to the source-SeNB instead of one as would be in the approach where the MeNB maintains the complete UE context sent directly to source-SeNB with some additional logic.

The embodiment provide various advantages. Mobility events/triggers of a communication device can be synchronised across single connectivity and dual connectivity devices. The MRO optimisation of dual connectivity events of a MeNB can be used for SeNB SC mobility and vice-versa. This may allow faster optimisation of MRO settings. By introduction of mobility-profile-Id or similar identity in a handover report MRO operations for different mobility configurations are made possible.

It is noted that whilst embodiments have been described in relation to LTE and particular components and architectures thereof, similar principles can be applied to any other communication system where communications can be provided via multiple access points or indeed to further developments with LTE. Instead of carriers provided by base stations at least one of the carriers may be provided by a mobile communication device. For example, this may be the case in application where no fixed equipment provided but at least a part of communications is provided by means of mobile equipment, for example in adhoc networks or other mobile stations that can act as a base or relay station and/or communicate directly with each other. Therefore, although certain embodiments were described above by way of example with reference to certain exemplifying architectures for wireless networks, technologies and standards, embodiments may be applied to any other suitable forms of communication systems than those illustrated and described herein.

The required data processing apparatus and functions of a base station apparatus, a communication device and any other appropriate apparatus may be provided by means of one or more data processors. The described functions may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the spirit and scope of this invention as defined in the appended claims. Indeed there is a further embodiment comprising a combination of one or more of any of the other embodiments previously discussed.

The invention claimed is:

1. A method, comprising:
controlling dual connectivity in a communication system, comprising:
  determining, by a master access point, information on at least one failure in relation to a cell change of a communication device connected by the dual connectivity to the master access point and a secondary access point; and
  communicating, by the master access point, the determined information by a transmitter to the secondary access point to cause the secondary access point to adjust in response to the at least one failure a configuration for use in mobility control of the communication device by the secondary access point, wherein the determined information comprises a profile identifier of the communication device for use by the secondary access point to identify the configuration associated with the communication device to adjust based on the determined information for the use in the mobility control of the communication device.

2. The method according to claim 1, wherein said information on at least one failure is determined based on information provided by at least one communication device regarding at least one secondary radio link failure.

3. The method according to claim 1, wherein the secondary access point adjusts its mobility control configuration based on single connectivity mobility failure information and dual connectivity mobility failure information.

4. The method according to claim 1, further comprising communicating information on mobility control parameters of the secondary access point to the master access point.

5. The method according to claim 4, wherein the information on the mobility control parameters is communicated as an offset to a predetermined value or values.

6. The method according to claim 1, wherein the determined information comprises at least one of hysteresis, time-to-trigger, mobility events threshold, a cell individual offset to neighbour cells, updated mobility control parameters, differentiating between mobility control configurations, determined failure type, failed cells, source cells, and type of the cell change.

7. An apparatus, comprising:
at least one processor; and
at least one memory including computer program code, where the at least one memory and the computer program code are configured, with the at least one processor, to cause the apparatus to perform:
controlling dual connectivity in a communication system comprising:
  determining information on at least one failure in relation to a cell change of a communication device connected by the dual connectivity to a master access point and a secondary access point, and
  causing communication of the determined information to the secondary access point to cause the secondary access point to adjust in response to the at least one failure a configuration for use in mobility control of the communication device by the secondary access point, wherein the determined information comprises a profile identifier of the communication device for use by the secondary access point to identify the configuration associated with the communication device to adjust based on the determined information for the use in the mobility control of the communication device.

8. The apparatus according to claim 7, wherein said information on at least one failure is based on information provided by at least one communication device regarding at least one secondary radio link failure.

9. The apparatus according to claim 7, wherein the secondary access point is configured to adjust its mobility configuration based on single connectivity mobility failure information and dual connectivity mobility failure information.

10. The apparatus according to claim 7, wherein the determined information comprises at least one of hysteresis, time-to-trigger, mobility events threshold, a cell individual offset to neighbour cells, updated measurement parameters, differentiating between mobility configurations, small cell mobility control parameters of the secondary access point, determined failure type, failed cells, source cells, and type of the cell change.

11. The apparatus according to claim 7, wherein the at least one memory including the computer program code is configured with the at least one processor to cause the apparatus to communicate a mobility profile identity along with information on the at least one failure.

12. The apparatus according to claim 7, configured to communicate control information to the communication device based on information received from the secondary access point regarding mobility control configuration of the secondary access point.

13. The apparatus of claim 7, wherein the apparatus is a master enhanced NodeB.

14. An apparatus, comprising:
at least one processor; and
at least one memory including computer program code, where the at least one memory and the computer program code are configured, with the at least one processor, to cause the apparatus to perform:
controlling dual connectivity in a communication system, comprising:
  receiving at a secondary access point information on at least one failure in relation to a cell change of a communication device connected to a master access point and the secondary access point, and
  using the information in mobility control of the communication device by the secondary access point to cause the secondary access point to adjust in response to the information on the at least one failure a configuration for use in mobility configuration of the communication device by the secondary access point, wherein the information comprises a profile identifier of the communication device for use by the secondary access point to identify the configuration associated with the communication device to adjust based on the determined information for the use in the mobility control of the communication device.

* * * * *